United States Patent
Bergqvist et al.

(10) Patent No.: US 8,942,700 B2
(45) Date of Patent: Jan. 27, 2015

(54) SYSTEM AND METHOD OPERABLE TO ENABLE SHORTEST CONNECTION ROUTE

(75) Inventors: Per Bergqvist, Luxembourg (LU); Stefan Willehadson, Uppsala (SE)

(73) Assignee: Synapse International S.A., Mamer (LU)

( * ) Notice: Subject to any disclaimer, the term of this patent is extended or adjusted under 35 U.S.C. 154(b) by 398 days.

(21) Appl. No.: 13/256,334

(22) PCT Filed: Mar. 25, 2010

(86) PCT No.: PCT/SE2010/050329
§ 371 (c)(1),
(2), (4) Date: Sep. 13, 2011

(87) PCT Pub. No.: WO2010/114464
PCT Pub. Date: Oct. 7, 2010

(65) Prior Publication Data
US 2012/0008564 A1     Jan. 12, 2012

(30) Foreign Application Priority Data
Apr. 1, 2009  (SE) ........................................ 0950211

(51) Int. Cl.
*H04M 15/00*       (2006.01)
*H04W 36/00*      (2009.01)
(Continued)

(52) U.S. Cl.
CPC ............... *H04L 12/66* (2013.01); *H04M 15/80* (2013.01); *H04M 17/00* (2013.01); *H04M 15/00* (2013.01);
(Continued)

(58) Field of Classification Search
CPC ....... H04M 15/00; H04W 36/00; H04L 12/28
USPC ......... 370/400, 401, 338, 352, 389, 329, 468, 370/351, 341, 360, 395.4; 379/93.22, 379/114.01, 114.02, 114.07, 114.08; 455/432.1, 433, 435.1, 436, 445, 452.2
See application file for complete search history.

(56) References Cited

U.S. PATENT DOCUMENTS 7,958,238 B1 *  6/2011  Batz et al. ..................... 709/225
8,442,485 B2 *  5/2013  Chowdhury et al. ......... 455/406
(Continued)

FOREIGN PATENT DOCUMENTS

WO       01/76188       10/2001
WO       03/015353      2/2003
(Continued)

OTHER PUBLICATIONS

L. Morand et al., "Global mobility approach with Mobile IP in "All IP" networks," IEEE, 2002.
(Continued)

*Primary Examiner* — Hanh N Nguyen
(74) *Attorney, Agent, or Firm* — Drinker Biddle & Reath LLP

(57) ABSTRACT

The present invention relates to a system operable to enable shortest connection route for a mobile means of a subscriber, when the mobile means has roamed between a home network comprised in the system, and a foreign network comprised in the system. When the mobile means requests connection to Internet I, a serving means comprised in the foreign network is operable to communicate with, and to receive information regarding a voucher, representing an amount of money, regarding the foreign network, from a voucher registry means comprised in the system. If a voucher, representing enough amount of money, is registered in the voucher registry means, the serving means is operable to route a packet to a gateway means comprised in the foreign network. The gateway means is operable to allocate an IP address for the mobile means and to function as an access point to Internet I.

13 Claims, 2 Drawing Sheets

(51) Int. Cl.
*H04L 12/28* (2006.01)
*H04M 17/00* (2006.01)
*H04L 12/14* (2006.01)
*H04L 12/66* (2006.01)
*H04W 4/24* (2009.01)
*H04L 29/12* (2006.01)
*H04W 8/08* (2009.01)

(52) U.S. Cl.
CPC ..... *H04M 2215/74* (2013.01); *H04M 2215/745* (2013.01); *H04M 15/8038* (2013.01); *H04M 2215/7464* (2013.01); *H04M 2215/7442* (2013.01); *H04M 2215/7009* (2013.01); *H04M 15/8055* (2013.01); *H04M 15/8061* (2013.01); *H04M 2215/7471* (2013.01); *H04M 15/8044* (2013.01); *H04M 15/705* (2013.01); *H04L 29/12207* (2013.01); *H04L 12/14* (2013.01); *H04L 61/20* (2013.01); *H04L 12/146* (2013.01); *H04W 4/24* (2013.01); *H04W 8/082* (2013.01)
USPC ............... 455/436; 379/114.02; 370/351

(56) References Cited

U.S. PATENT DOCUMENTS

| | | |
|---|---|---|
| 2002/0085517 A1 | 7/2002 | Lee et al. |
| 2004/0017905 A1 | 1/2004 | Warrier et al. |
| 2006/0104284 A1 | 5/2006 | Chen |
| 2006/0274672 A1 | 12/2006 | Venkitaraman et al. |
| 2006/0291422 A1 | 12/2006 | Rochford |
| 2007/0291705 A1 | 12/2007 | Iyer et al. |
| 2012/0008564 A1 | 1/2012 | Bergqvist et al. |
| 2012/0014283 A1* | 1/2012 | Bergqvist et al. ............ 370/253 |

FOREIGN PATENT DOCUMENTS

| | | |
|---|---|---|
| WO | WO 03/058996 | 7/2003 |
| WO | 2007/104324 | 9/2007 |
| WO | 2008/003337 | 1/2008 |

OTHER PUBLICATIONS

International Search Report issued on Jul. 26, 2010 in International Application No. PCT/SE2010/050329 filed Mar. 25, 2010.

* cited by examiner

SYSTEM AND METHOD OPERABLE TO ENABLE SHORTEST CONNECTION ROUTE

CROSS REFERENCE TO RELATED APPLICATIONS

This application is a §371 National Stage Application of PCT International Application No. PCT/SE2010/050329, filed Mar. 25, 2010, and claims priority under 35 U.S.C. §119 and/or §365 to Swedish Application No. 0950211-3 filed Apr. 1, 2009.

FIELD OF THE INVENTION

The present invention relates in a first aspect to a system operable to enable shortest connection route for a mobile means of a subscriber.

According to a second aspect the present invention relates to a method for enabling shortest connection route for a mobile means of a subscriber.

According to a third aspect the present invention relates to at least one to computer program product for enabling shortest connection route for a mobile means of a subscriber.

BACKGROUND OF THE INVENTION

The patent document US 2006/0291422 A1 relates to mobility management in a communication system of at least two communication networks. A mobile node is associated with one of the at least two communication networks as a home network and is allocated a global home address, a certificate and a corresponding private key by a home agent of the home network. When roaming in a communication network other than the home network, the mobile node requests a binding operation of a current routing address in the other communication network and the global home address at the home agent of the home network, comprising, at the home agent, the use of the correct allocated global home address by the mobile node by means of a digital signature and the certificate allocated to the mobile node.

The patent document WO 01/76188 A2 relates to a method of allocating a network address for an application to use during a session between a first node in a domain and a mobile node in a visited domain. The method comprises the steps of allocating a care of address with a global home agent associated with the mobile node; the global home agent informing the first node of the allocated care of address; and the first node informing the application of the care of address.

The patent document US 2007/0291705 A1 relates to techniques for proving location/presence-based information using mobile IP. A mobile node is associated with a home agent in a home network different from the access network. The location/presence-based information is determined at the point of attachment and is added to a registration request at the layer 3 protocol layer. The registration request is then sent from the point of attachment to the home agent. When the registration request is received at the home agent, the home agent parses the registration request to determine the location/presence-based information from the request. The home agent then performs a location/presence service using the location/presence information.

The patent document US 2006/0274672 A1 relates to a system and method that reduces unnecessary data traffic over the access links to a mobile router or to other network components. Packets that are to be sent unnecessarily to the mobile router are intercepted before they can be sent to a router or other network device. Consequently, system resources are not used for the unnecessary data transmissions and the efficiency of the network is substantially enhanced.

The document "Global mobility approach with Mobile IP in "All IP" networks"; L. Morand; S. Tessier; IEEE, relates to how the EUROSCOM project P1013FIT-MIP evaluates the use of Mobile IP in an IP core network, acting as a mobility management protocol federating heterogeneous access network technologies such as PSTN, Wlan or GPRS. The aim is to provide a wide IP environment with an always-on access to IP applications, Mobile IP functionalities enabling seamless mobility through the various networks.

In the world today it is quite common that people travel to other countries as tourists or for business reasons bringing with them their computers that are connected to the Internet using the cellular networks. The connection is routed via the guest operators network to the home operators network via a gateway and then to the Internet via the home operators access point. This routing is not optimal in the sense of network usage, e. g. a lot of bandwidth between the operators are used for no particular reason.

The above mentioned solutions suffer from a lot of disadvantages. Current Internet routings when roaming into a guest operators network are non-optimal leading to, among other things, higher costs for the operator as well as the subscriber as well as slower Internet connections. Very often the cost plan for a particular subscriber is a non flat rate or a virtual flat rate leading to the situation that the home operator wants to keep track of the amount of transferred data. This leads to the current situation that the operator wants, and also needs, to do the actual Internet access for the subscriber using the operators own Internet access point. Consequently, the usage of the operators' network is non-optimal giving rise to cost and network problems.

SUMMARY OF THE INVENTION

The above mentioned problems are solved with a system operable to enable shortest connection route for a mobile means of a subscriber according to claim 1, when the mobile means has roamed between a home network comprised in the system, and a foreign network comprised in the system. When the mobile means requests connection to Internet, a serving means comprised in the foreign network is operable to communicate with, and to receive information regarding a voucher, representing an amount of money, regarding the foreign network, from a voucher registry means comprised in the system. If a voucher, representing enough amount of money, is registered in the voucher registry means, the serving means is operable to route a packet to a gateway means comprised in the foreign network. The gateway means is operable to allocate an IP address for the mobile means and to function as an access point to Internet.

A main advantage with this solution is that it is possible for the operators to optimize the network usage regarding subscribers that are accessing the Internet. Another advantage is that it gives a subscriber a possibility to access Internet without having to do it via the home network, if the subscriber thinks it is too expensive, or there is no roaming agreement between the home network and the foreign network.

A further advantage in this context is achieved if the gateway means also is operable to count every byte transferred to/from the mobile means, and to communicate the count of bytes to the serving means, which in turn also is operable to deduct an amount of money corresponding to the count of bytes from the amount of money represented by the voucher, and to register a new amount of money for the voucher in the voucher registry means. In this way it is possible to control the amount of money left on a voucher.

Furthermore, it is an advantage in this context if the serving means also is operable, if the amount of money represented by the voucher decreases to zero, to stop the connection to Internet via the gateway means. In this way it is possible to control that no subscriber is using too much money.

A further advantage in this context is achieved if the gateway means is operable to communicate the count of bytes to the serving means at the end of a session. In this way it is secured that the communication is performed regularly.

According to another embodiment it is an advantage if the gateway means is operable to communicate the count of bytes to the serving means upon request. Hereby, the communication can be performed at will.

Furthermore, it is an advantage in this context if the serving means is in the form of a Serving GPRS Support Node (SGSN).

A further advantage in this context is achieved if the gateway means is in the form of a Gateway GPRS Support Node (GGSN).

Furthermore, it is an advantage in this context if the mobile means is in the form of a mobile telephone, a personal digital assistant (PDA), or a mobile computer.

The above mentioned problems are also solved with a method for enabling shortest connection route according to claim 9, when the mobile means has roamed between a home network and a foreign network. The method is performed with the aid of a system comprising the home network and the foreign network. The method comprises the steps:

with the aid of the mobile means, to request connection to Internet;

with the aid of a serving means comprised in the foreign network, to communicate with, and to receive information regarding a voucher, representing an amount of money, regarding the foreign network, from a voucher registry means comprised in the system;

if a voucher, representing enough amount of money, is registered in the voucher registry means, with the aid of the serving means, to route a packet to a gateway means comprised in the foreign network; and with the aid of the gateway means, to allocate an IP address for the mobile means, and to function as an access point to Internet.

A main advantage with this solution is that it is possible for the operators so to optimize the network usage regarding subscribers that are accessing the Internet. Another advantage is that it gives a subscriber a possibility to access Internet without having to do it via the home network, if the subscriber thinks it is too expensive, or there is no roaming agreement between the home network and the foreign network.

A further advantage in this context is achieved if the method also comprises the steps:

with the aid of the gateway means, to count every byte transferred to/from the mobile means;

to communicate the count of bytes to the serving means;

with the aid of the serving means, to deduct an amount of money corresponding to the count of bytes from the amount of money represented by the voucher; and to register a new amount of money for the voucher in the voucher registry means. In this way it is possible to control the amount of money left on a voucher.

Furthermore, it is an advantage in this context if the method also comprises the step:

if the amount of money represented by the voucher decreases to zero, with the aid of the serving means, to stop the connection to Internet via the gateway means. In this way it is possible to control that no subscriber is using too much money.

A further advantage in this context is achieved if the step to communicate the count of bytes to the serving means is performed at the end of a session. In this way it is secured that the communication is performed regularly.

According to another embodiment it is an advantage if the step to communicate the count of bytes to the serving means is performed upon request. Hereby, the communication can be performed at will.

The above mentioned problems are also solved with at least one computer program product according to claim 14. The at least one computer program product is/are directly loadable into the internal memory of at least one digital computer, and comprises software code portions for performing the steps of the method according the present invention when the at least one product is/are run on the at least one computer.

A main advantage with this solution is that it is possible for the operators to optimize the network usage regarding subscribers that are accessing the Internet. Another advantage is that it gives a subscriber a possibility to access Internet without having to do it via the home network, if the subscriber thinks it is too expensive, or there is no roaming agreement between the home network and the foreign network.

It will be noted that the term "comprises/comprising" as used in this description is intended to denote the presence of a given characteristic, step or component, without excluding the presence of one or more other characteristic, features, integers, steps, components or groups thereof.

Embodiments of the invention will now be described with a reference to the accompanying drawings, in which:

DETAILED DESCRIPTION OF THE PREFERRED EMBODIMENTS

Figure 1:
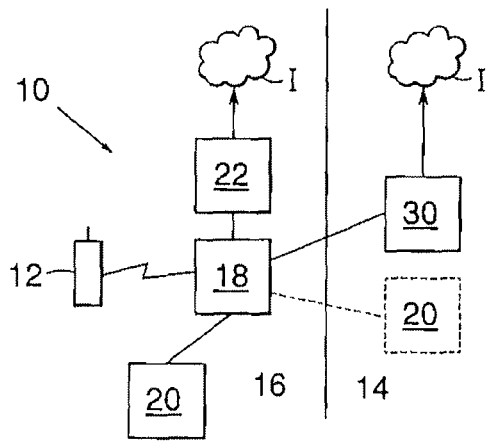
FIG. 1 is a block diagram of a system operable to enable shortest connection route for a mobile means of a subscriber according to the present invention.

In FIG. 1 there is disclosed a block diagram of a system 10 operable to enable shortest connection route for a mobile means 12 of a subscriber according to the present invention. The system 10 is operable to enable shortest connection route for the mobile means 12 of a subscriber, when the mobile means 12 has roamed between a home network 14 comprised in the system 10, and a foreign network 16 comprised in the system 10. The home network 14 and the foreign network 16 are only disclosed schematically in FIG. 1, by having a dividing line in FIG. 1 between the home network 14 and the foreign network 16. As is apparent in FIG. 1, the foreign network 16 also comprises a serving means 18, which is operable to communicate with a voucher registry means 20 comprised in the system 10. The serving means 18 is connected to the voucher registry means 20, which in turn can be comprised in either the foreign network 16 or the home network 14. Because of that the voucher registry means 20 comprised in the home network 14 is disclosed with a broken line. The serving means 18 is operable to communicate with, and to receive information regarding a voucher, representing an amount of money, regarding the foreign network 16, from the voucher registry means 20. In the foreign network 16 the serving means 18 is connected to a gateway means 22. Furthermore, the serving means 18 is also connected to a gateway means 30 comprised in the home network 14. If a voucher, representing enough amount of money, is registered in the voucher registry means 20, the serving means 18 is operable to route a packet to the gateway means 22. The gateway means 22 in turn is operable to allocate an IP address for the mobile means 12 and to function as an access point to Internet I. As is apparent in FIG. 1, Internet I are schematically disclosed in the form of two "clouds" I, one "cloud" each in the home network 14 and in the foreign network 16, because it is possible to access Internet I both via the home network 14 and the foreign network 16.

According to a preferred embodiment, the gateway means 22 is also operable to count every byte transferred to/from the mobile means 12, and to communicate the count of bytes to the serving means 18. Thereafter, the serving means 18 is operable to deduct an amount of money corresponding to the count of bytes from the amount of money represented by the voucher, and to register a new amount of money for the voucher in the voucher registry means 20.

Furthermore, according to another embodiment, the serving means 18 is also operable, if the amount of money represented by the voucher decreases to zero, to stop the connection to Internet I via the gateway means 22.

According to yet another embodiment, the gateway means 22 is operable to communicate the count of bytes to the serving means 18 at the end of a session.

According to another alternative, the gateway means 22 is operable to communicate the count of bytes to the serving means 18 upon request.

According to a preferred embodiment, the serving means 18 is in the form of a Serving GPRS Support Node (SGSN).

According to another embodiment, the gateway means 22,30 each is in the form of a Gateway GPRS Support Node (GGSN).

According to yet another embodiment, the mobile means 12 is in the form of a mobile telephone, a personal digital assistant (PDA), or a mobile computer.

Figure 2:
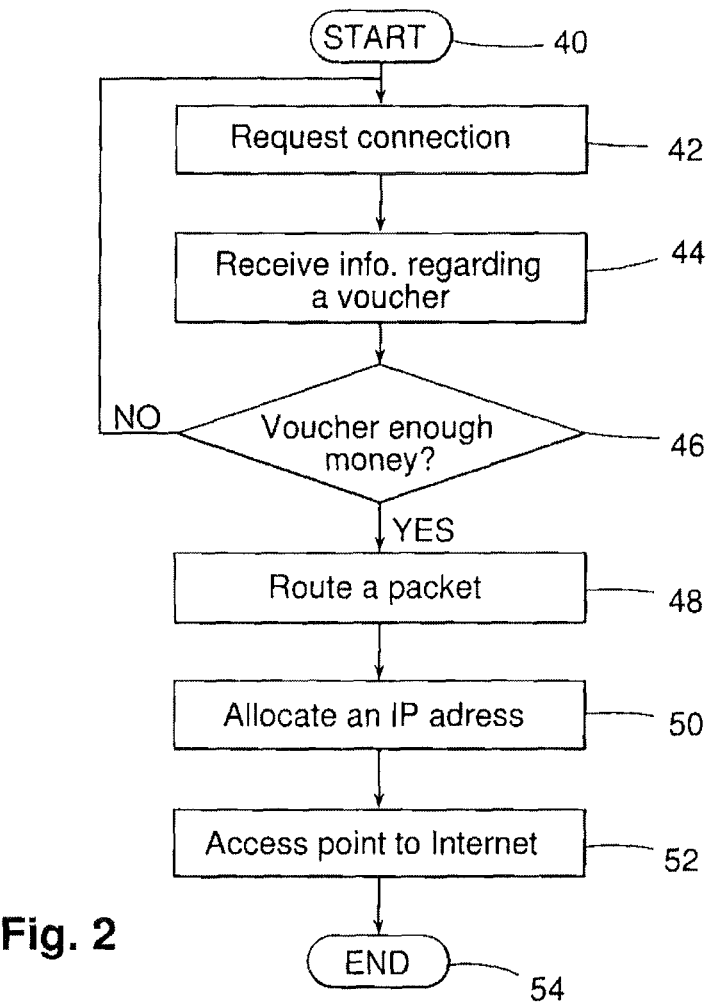
FIG. 2 is a flow chart of a method for enabling shortest connection route for a mobile means of a subscriber according to the present invention.

In FIG. 2 there is disclosed a flow chart of a method for enabling shortest connection route for a mobile means 12 (see FIG. 1) of a subscriber according to the present invention. The method is performed with the aid of a system 10 (see FIG. 1), when the mobile means 12 has roamed between a home network 14 comprised in the system 10, and a foreign network 16 comprised in the system 10. The method begins at block 40. Thereafter, the method continues, at block 42, with the step: to request connection to Internet with the aid of the mobile means 12. The method continues, at block 44, with the step: with the aid of a serving means 18 comprised in the foreign network 16, to communicate with, and to receive information regarding a voucher, representing an amount of money, regarding the foreign network 16, from a voucher registry means 20 comprised in the system 10. Thereafter, the method continues, with the step: to ask the question; does the voucher registered in the voucher registry means 20 represent enough money? If the answer is negative, the method continues with performing the step 42 again. If, on the other hand, the answer is affirmative, the method continues, at block 48, with the step: with the aid of the serving means 18, to route a packet to a gateway means 22 comprised in the foreign network 16. The method continues, at block 50, with the step: to allocate an IP address for the mobile means 12 with the aid of the gateway means 22. Thereafter, the method continues, at block 52, with the step: the gateway means 22 functions as an access point to Internet I. The method is completed at block 54.

According to a preferred embodiment, the method also comprises the steps:
  to count every byte transferred to/from the mobile means 12 with the aid of the gateway means 22;
  to communicate the count of bytes to the serving means 18;
  to deduct an amount of money corresponding to the count of bytes from the amount of money represented by the voucher with the aid of the serving means 18; and
  to register a new amount of money for the voucher in the voucher registry means 20.

Furthermore, according to another embodiment, the method also comprises the step: if the amount of money represented by the voucher decreases to zero; to stop the connection to Internet I via the gateway means 22 with the aid of the serving means 18.

According to a preferred embodiment, the step to communicate the count of bytes to the serving means 18 is performed at the end of a session.

According to another embodiment, the step to communicate the count of bytes to the serving means 18 is performed upon request.

Figure 3:
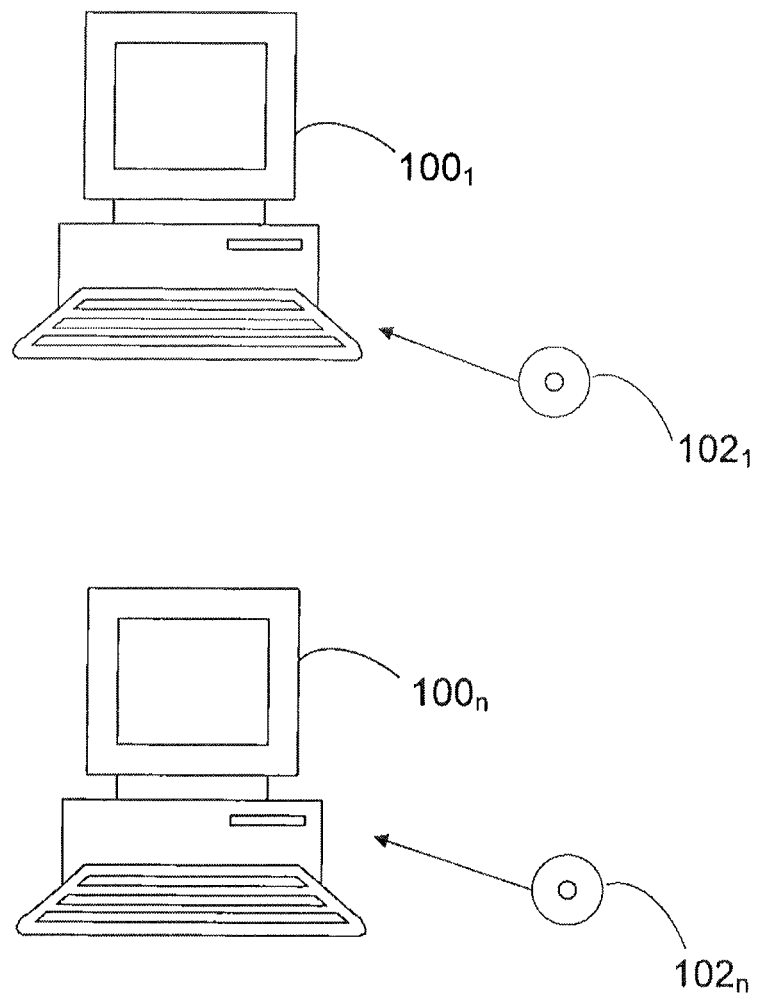
FIG. 3 schematically shows a number of computer program products according to the present invention.

In FIG. 3, some computer program products $102_1, \ldots, 102_n$ according to the present invention are schematically shown. In FIG. 3, n different digital computers $100_1, \ldots, 100_n$ are shown, wherein n is an integer. In FIG. 3, n different computer program products $102_1, \ldots, 102_n$ are shown, here shown in the form of CD discs. The different computer program products $102_1, \ldots, 102_n$ are directly loadable into the internal memory of the n different computers $100_1, \ldots, 100_n$. Each computer program product $102_1, \ldots, 102_n$ comprises software code portions for performing all the steps according to FIG. 2, when the product/products $102_1, \ldots, 102_n$ is/are run on the computers $100_1, \ldots, 100_n$. The computer program products $102_1, \ldots, 102_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following Claims.

The invention claimed is:

1. A system configured to provide for a shortest connection route for a mobile device of a subscriber, the system comprising:
  a home network;
  a foreign network, the mobile device roaming between the home network and the foreign network, the foreign network associated with a voucher registry device, wherein the foreign network includes a serving device configured to communicate with the voucher registry device, and a gateway device configured to connect to the Internet,
  the serving device configured to receive information regarding a voucher, representing an amount of money, regarding the foreign network, from the voucher registry device, and if the received voucher, representing a sufficient amount of money, is registered in the voucher registry device, the serving device is configured to route a packet from the serving device to the gateway device,
  the gateway device is configured to allocate an IP address for the mobile device and is configured to operate as an access point to the Internet for the mobile device, and
  the home network is not associated with the voucher registry device.

2. The system according to claim 1, wherein the gateway device is further configured to count every byte transferred to and from the mobile device, and is configured to communicate the count of bytes to the serving device, and
the serving device is configured to deduct an amount of money corresponding to the count of bytes from the amount of money represented by the voucher, and to register a new amount of money for the voucher in the voucher registry device.

3. The system according to claim 2, wherein the gateway device is configured to communicate the count of bytes to the serving device at an end of a session.

4. The system according to claim 1, wherein the serving device is further configured to stop a connection to Internet via the gateway device, when the amount of money represented by the voucher decreases to zero.

5. The system according to claim 1, wherein the serving device includes a Serving GPRS Support Node.

6. The system according to claim 1, wherein the mobile device includes at least one of a mobile telephone, a personal digital assistant (PDA), and a mobile computer.

7. A method for providing a shortest connection route for a mobile device of a subscriber on a system, the system having a home network, a foreign network, the mobile device roaming between the home network and the foreign network, the foreign network associated with a voucher registry device, the foreign network having a serving device configured to communicate with the voucher registry device and a gateway device configured to connect to the Internet, the method comprising the steps of:
receiving information regarding a voucher at the serving device from the voucher registry device, the voucher representing an amount of money regarding the foreign network;
routing a packet from the serving device to the gateway device by the serving device, when the received voucher represents a sufficient amount of money is registered at the voucher registry device;
allocating an IP address for the mobile device at the gateway device; and
operating the gateway device as an access point at the foreign network to the Internet for the mobile device,
wherein the home network is not associated with the voucher registry device.

8. The method according to claim 7, further comprising the steps of:
counting every byte transferred to and from the mobile device at the gateway device;
communicating the count of bytes from the gateway device to the serving device; and
deducting an amount of money corresponding to the count of bytes from the amount of money represented by the voucher and registering a new amount of money for the voucher in the voucher registry device by the serving device.

9. The method according to claim 8, further comprising the step of:
communicating the count of bytes from the gateway device to the serving device at an end of a session.

10. The method according to claim 7, further comprising the step of:
stopping a connection to the Internet via the gateway device by the serving device, when the amount of money represented by the voucher decreases to zero.

11. The method according to claim 7, wherein the serving device includes a Serving GPRS Support Node.

12. The method according to claim 7, wherein the mobile device includes at least one of a mobile telephone, a personal digital assistant (PDA), and a mobile computer.

13. A non-transitory computer readable medium having computer code recorded thereon, the computer code configured to perform a method when executed on a system, the system having a home network, a foreign network, the mobile device roaming between the home network and the foreign network, the foreign network associated with a voucher registry device, the foreign network having a serving device configured to communicate with the voucher registry device and a gateway device configured to connect to the Internet, the method comprising the steps of:
receiving information regarding a voucher at the serving device from the voucher registry device, the voucher representing an amount of money regarding the foreign network;
routing a packet from the serving device to the gateway device by the servicing device, when the received voucher represents a sufficient amount of money is registered in the voucher registry device;
allocating an IP address for the mobile device at the gateway device; and
operating the gateway device as an access point to the Internet at the foreign network for the mobile device,
wherein the home network is not associated with the voucher registry device.

* * * * *